US011535253B2

(12) United States Patent
Qiao et al.

(10) Patent No.: US 11,535,253 B2
(45) Date of Patent: Dec. 27, 2022

(54) LANE CHANGE MANEUVER INTENTION DETECTION SYSTEMS AND METHODS

(71) Applicant: GM GLOBAL TECHNOLOGY OPERATIONS LLC, Detroit, MI (US)

(72) Inventors: Ningsheng Qiao, Troy, MI (US); Stanley J. Modjeski, South Lyon, MI (US); Dalia I. Karana, Troy, MI (US); Christopher A. Kinser, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 17/025,501

(22) Filed: Sep. 18, 2020

(65) Prior Publication Data

US 2022/0089163 A1 Mar. 24, 2022

(51) Int. Cl.
| *B60W 30/18* | (2012.01) |
| *B60W 40/08* | (2012.01) |
| *B60W 40/04* | (2006.01) |
| *B60W 30/12* | (2020.01) |

(52) U.S. Cl.
CPC ...... *B60W 30/18163* (2013.01); *B60W 30/12* (2013.01); *B60W 40/04* (2013.01); *B60W 40/08* (2013.01); *B60W 2420/42* (2013.01); *B60W 2540/225* (2020.02); *B60W 2552/53* (2020.02); *B60W 2554/4042* (2020.02)

(58) Field of Classification Search
USPC ........................................................ 701/119
See application file for complete search history.

(56) References Cited

U.S. PATENT DOCUMENTS

| 9,475,389 | B1* | 10/2016 | Fung .................. B60K 37/06 |
| 9,580,081 | B2* | 2/2017 | George-Svahn ...... B60W 50/10 |
| 9,616,809 | B1* | 4/2017 | Alasry .................. G08G 1/167 |
| 9,841,813 | B2* | 12/2017 | Srail ...................... G06F 3/013 |
| 10,011,216 | B1* | 7/2018 | Rovik .................. G06V 20/588 |
| 10,173,586 | B1* | 1/2019 | Kashchenko ........... G06F 3/017 |
| 10,401,960 | B2* | 9/2019 | Khalid .................... G06F 3/011 |
| 10,656,657 | B2* | 5/2020 | Djuric .................. G06N 3/0454 |
| 10,671,071 | B2* | 6/2020 | Jang ...................... B60W 60/00 |
| 10,816,982 | B2* | 10/2020 | Lee .................. G08G 1/096783 |
| 10,839,681 | B2* | 11/2020 | Fukumoto ......... B60W 30/0956 |
| 10,882,398 | B2* | 1/2021 | Cordell ............... G06V 20/597 |
| 11,112,796 | B2* | 9/2021 | Djuric .................. G05D 1/0088 |
| 11,267,483 | B2* | 3/2022 | Adam .............. B60W 30/18163 |
| 2010/0156617 | A1* | 6/2010 | Nakada .................. A61B 3/113 340/439 |
| 2011/0169625 | A1* | 7/2011 | James ................. B60W 30/095 340/439 |
| 2012/0271484 | A1* | 10/2012 | Feit ....................... B60W 40/04 701/1 |

(Continued)

*Primary Examiner* — Jonathan M Dager
(74) *Attorney, Agent, or Firm* — Lorenz & Kopf LLP (57) ABSTRACT

In various embodiments, methods, systems, and vehicles are provided controlling a vehicle. In an exemplary embodiment, a method includes: monitoring an eye gaze of a driver of the vehicle; monitoring current traffic conditions surrounding the vehicle; predicting an intention of the driver to perform a lane change maneuver based on the eye gaze, a history of the eye gaze of the driver, and the current traffic conditions; and controlling, by the processor, the vehicle based on the predicted intention of the driver to perform a lane change maneuver.

14 Claims, 6 Drawing Sheets

(56) References Cited

U.S. PATENT DOCUMENTS

| | | | | |
|---|---|---|---|---|
| 2013/0024047 | A1* | 1/2013 | Kalhous | G06F 3/013 |
| | | | | 701/1 |
| 2014/0148988 | A1* | 5/2014 | Lathrop | B60W 30/182 |
| | | | | 701/1 |
| 2014/0258942 | A1* | 9/2014 | Kutliroff | G06F 3/013 |
| | | | | 715/863 |
| 2014/0354539 | A1* | 12/2014 | Skogo | G06F 3/013 |
| | | | | 345/156 |
| 2014/0361971 | A1* | 12/2014 | Sala | G06F 3/013 |
| | | | | 345/156 |
| 2015/0234459 | A1* | 8/2015 | George-Svahn | B60K 26/02 |
| | | | | 345/156 |
| 2016/0046298 | A1* | 2/2016 | DeRuyck | G06V 20/597 |
| | | | | 340/576 |
| 2016/0221575 | A1* | 8/2016 | Posch | B60W 30/14 |
| 2016/0320835 | A1* | 11/2016 | Kuehne | G06F 3/013 |
| 2017/0131719 | A1* | 5/2017 | Micks | G06V 20/584 |
| 2017/0158193 | A1* | 6/2017 | Lopez | B60W 30/18154 |
| 2017/0282930 | A1* | 10/2017 | Kochhar | B60W 50/0097 |
| 2017/0364147 | A1* | 12/2017 | Canella | G06F 16/22 |
| 2018/0059670 | A1* | 3/2018 | Nilsson | B60W 30/09 |
| 2018/0354517 | A1* | 12/2018 | Banno | B60W 50/12 |
| 2019/0118834 | A1* | 4/2019 | Wiebel-Herboth | G06F 3/013 |
| 2019/0156134 | A1* | 5/2019 | Krishnan | G06V 20/59 |
| 2020/0184238 | A1* | 6/2020 | Kobayashi | G06V 40/161 |
| 2020/0189595 | A1* | 6/2020 | Bertollini | G06F 3/016 |
| 2021/0061277 | A1* | 3/2021 | Zhang | B60W 10/04 |
| 2022/0212661 | A1* | 7/2022 | Kido | B60W 30/0956 |

* cited by examiner

LANE CHANGE MANEUVER INTENTION DETECTION SYSTEMS AND METHODS

TECHNICAL FIELD

The technical field generally relates to the field of vehicles and, more specifically, to methods and systems for detecting intentions of a driver to perform a lane change maneuver.

Artificial intelligence techniques can be used to track a driver's eye gaze. When driving, a driver typically looks in certain directions to see if the road is clear of obstacles before traveling in that direction. Thus, a diver's eye gaze can be used to determine intentions of the driver to perform a driving maneuver.

Accordingly, it is desirable to provide computerized methods and systems for using a driver's eye gaze to predict driver intention. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided for controlling a vehicle. The method includes: monitoring an eye gaze of a driver of the vehicle; monitoring current traffic conditions surrounding the vehicle; predicting an intention of the driver to perform a lane change maneuver based on the eye gaze, a history of the eye gaze of the driver, and the current traffic conditions; and controlling, by the processor, the vehicle based on the predicted intention of the driver to perform a lane change maneuver.

In various embodiments, the method includes obtaining a camera image of the driver of the vehicle, via a camera of the vehicle, and wherein the monitoring the eye gaze is based on the camera image.

In various embodiments, the monitoring the eye gaze comprises counting a number of driver eye switches from a first on-road direction to a second side mirror direction, and wherein the predicting the intention of the driver to perform a lane change maneuver is based on the number. In various embodiments, the monitoring the eye gaze comprises accumulating a time of focus of the eye gaze on a side mirror, and wherein the predicting the intention of the driver to perform the lane change maneuver is based on the accumulated time of focus.

In various embodiments, the method includes learning the history of the eye gaze and the predicted intention of the driver, and predicting future intentions of the driver based on the history of the eye gaze.

In various embodiments, the method includes confirming the predicted intention of the driver with the driver through a human machine interface.

In various embodiments, the lane change maneuver includes at least one of a left lane change and a right lane change. In various embodiments, the traffic conditions include wherein the traffic conditions include an adjacent lane maintaining safety margins to all relevant traffic participants and objects, and the vehicle being positioned within a safety corridor, wherein the safety corridor defines upper and lower boundaries associated with a longitudinal position of a lane change maneuver.

In various embodiments, the lane change maneuver includes an overtaking. In various embodiments, the traffic conditions include a vehicle speed of a front, in-path vehicle, and a number of lanes.

In another exemplary embodiment, a system includes: a driver monitoring system configured to capture driver eye gaze data; a perception system configured to capture perception data associated with the environment of the vehicle; and a processor configured to: monitor the driver gaze data to determine an eye gaze of a driver of the vehicle; monitor the perception data to determine current traffic conditions surrounding the vehicle; predict an intention of the driver to perform a lane change maneuver based on the eye gaze, a history of the eye gaze, and the current traffic conditions; and control the vehicle based on the predicted intention of the driver to perform a lane change maneuver. In various embodiments, the driver monitoring system is further configured to obtain a camera image of the driver of the vehicle, via a camera of the vehicle, and wherein the processor monitors the eye gaze is based on the camera image.

In various embodiments, the processor is configured to monitor the eye gaze by counting a number of driver eye switches from a first on-road direction to a second side mirror direction, and wherein the processor is configured to predict the intention of the driver to perform a lane change maneuver based on the number.

In various embodiments, the processor is configured to monitor the eye gaze by accumulating a time of focus of the eye gaze on a side mirror, and wherein the processor is configured to predict the intention of the driver to perform the lane change maneuver based on the accumulated time of focus.

In various embodiments, the processor is further configured to learn a history of the eye gaze and the predicted intention of the driver, and predict future intentions of the driver based on the history of the eye gaze.

In various embodiments, the processor is further configured to confirm the predicted intention of the driver with the driver through a human machine interface.

In various embodiments, the lane change maneuver includes at least one of a left lane change and a right lane change. In various embodiments, the traffic conditions include wherein the traffic conditions include an adjacent lane maintaining safety margins to all relevant traffic participants and objects, and the vehicle being positioned within a safety corridor, wherein the safety corridor defines upper and lower boundaries associated with a longitudinal position of a lane change maneuver.

In various embodiments, the lane change maneuver includes an overtaking. In various embodiments, the traffic conditions include a vehicle speed of a front, in-path vehicle, and a number of lanes.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
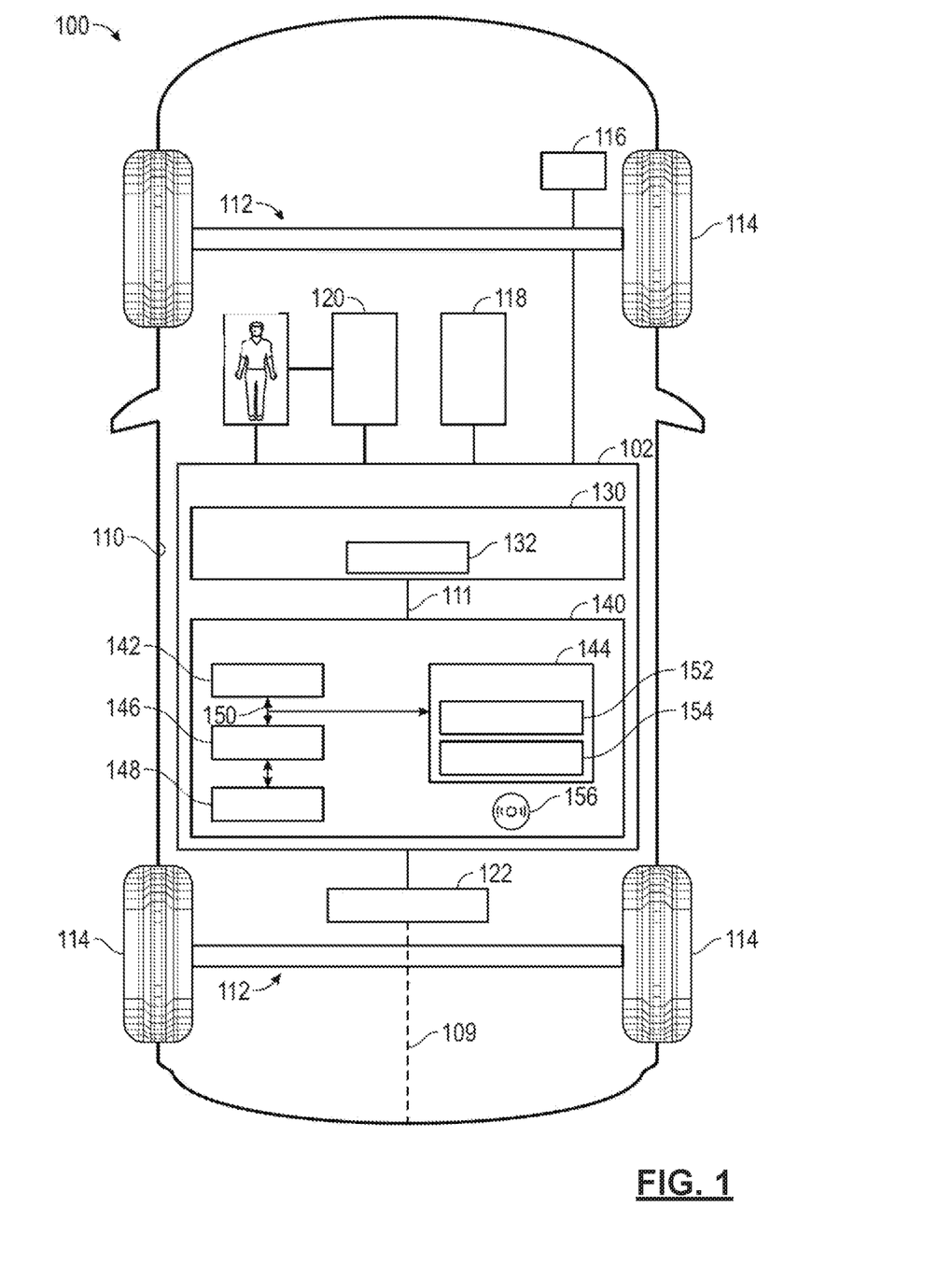
FIG. 1 is a functional block diagram of a vehicle that includes a control system for predicting driver lane change maneuvers, in accordance with various embodiments.

FIG. 1 illustrates a vehicle 100, according to an exemplary embodiment. As described in greater detail further below, the vehicle 100 includes a control system 102 for predicting the intentions of a driver of the vehicle 100 to perform a lane change maneuver such as a lane change or overtaking of another vehicle. In various embodiments, the control system 102 is configured to track the gaze of the eyes of the driver of the vehicle 100 to predict the intentions, using techniques described in connection with FIGS. 2-6. In various embodiments, the control system 102 is configured to monitor current traffic conditions to predict the intentions, using techniques described in connection with FIGS. 2-6.

In various embodiments, the vehicle 100 may comprise any number of different types of vehicles or mobile platforms. In certain embodiments, the vehicle 100 comprises a land-based vehicle, such as any one of a number of different types of automobiles, such as, for example, a sedan, a wagon, a truck, or a sport utility vehicle (SUV), motorcycle, and/or other land-based vehicles. In various embodiments, the vehicle 100 is an autonomous vehicle comprising one or more autonomous or semi-autonomous driving features.

In the depicted exemplary embodiment, the vehicle 100 includes a body 110 that is arranged on a chassis 109. The body 110 substantially encloses other components of the vehicle 100. The body 110 and the chassis 109 may jointly form a frame. The vehicle 100 also includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

Also, in the depicted exemplary embodiment, a drive system 116 is mounted on the chassis 109 and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments the control system 102 includes a sensor array 130 and a computer system 140. In various embodiments, the control system 102 is mounted on the chassis 109.

In various embodiments, the sensor array 130 includes one or more cameras 132 in proximity to the driver. In certain embodiments, the camera 132 is positioned within a head-up unit 120 of the vehicle 100 (e.g., within or on a front dash of the vehicle 100). In certain other embodiments, the camera 132 is positioned within or on a mirror 118 of the vehicle 100, such as a rear-view mirror. In various embodiments, the camera 132 is positioned toward the driver, particularly toward a face thereof, to capture images of the face of the driver.

In certain embodiments, the sensor array 130 includes one or more other sensors used for capturing information about the environment of the vehicle 100 or the vehicle itself. Such sensors can be referred to as a perception system and can include, but are not limited to, cameras, radars, lidars, GPS, etc. or other vehicle sensors. Such sensor can be mounted to an exterior of the vehicle 100.

In various embodiments, the computer system 140 is coupled to the sensor array 130 via a communication link 111 and receives camera images and perception system data via the communication link 111. In certain embodiments, the communication link 111 comprises one or more wired connections, such as one or more cables (e.g. coaxial cables and/or one or more other types of cables), and/or one or more wireless connections (e.g. using wireless bus technology).

In various embodiments, the computer system 140 receives the camera images from the camera 132 and identifies the gaze direction of the eyes (or eye) of the driver of the vehicle 100 using the camera images. In various embodiments, the computer system 140 receives the sensor data from the perception system and identifies the current traffic conditions using the sensor data.

In the depicted embodiment, the computer system 140 includes a processor 142, a memory 144, an interface 146, a storage device 148, and a bus 150. The processor 142 performs the computation and control functions of the computer system 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the computer system 140 and the computer system of the computer system 140, generally in executing the processes described herein, such as the process 200 described in connection with FIGS. 2-4.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154.

The bus 150 serves to transmit programs, data, status and other information or signals between the various components of the computer system of the computer system 140. The interface 146 allows communication to the computer system of the computer system 140, for example from a system driver and/or another computer system and can be implemented using any suitable method and apparatus. In one embodiment, the interface 146 obtains the various data from the camera 132. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes or methods of the present disclosure, such as the steps of the process 200 (and any sub-processes thereof) described in connection with FIGS. 2-6. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the computer system 140 may also otherwise differ from the embodiment depicted in FIG. 1, for example in that the computer system of the computer system 140 may be coupled to or may otherwise utilize one or more remote computer systems and/or other control systems.

Figure 2:
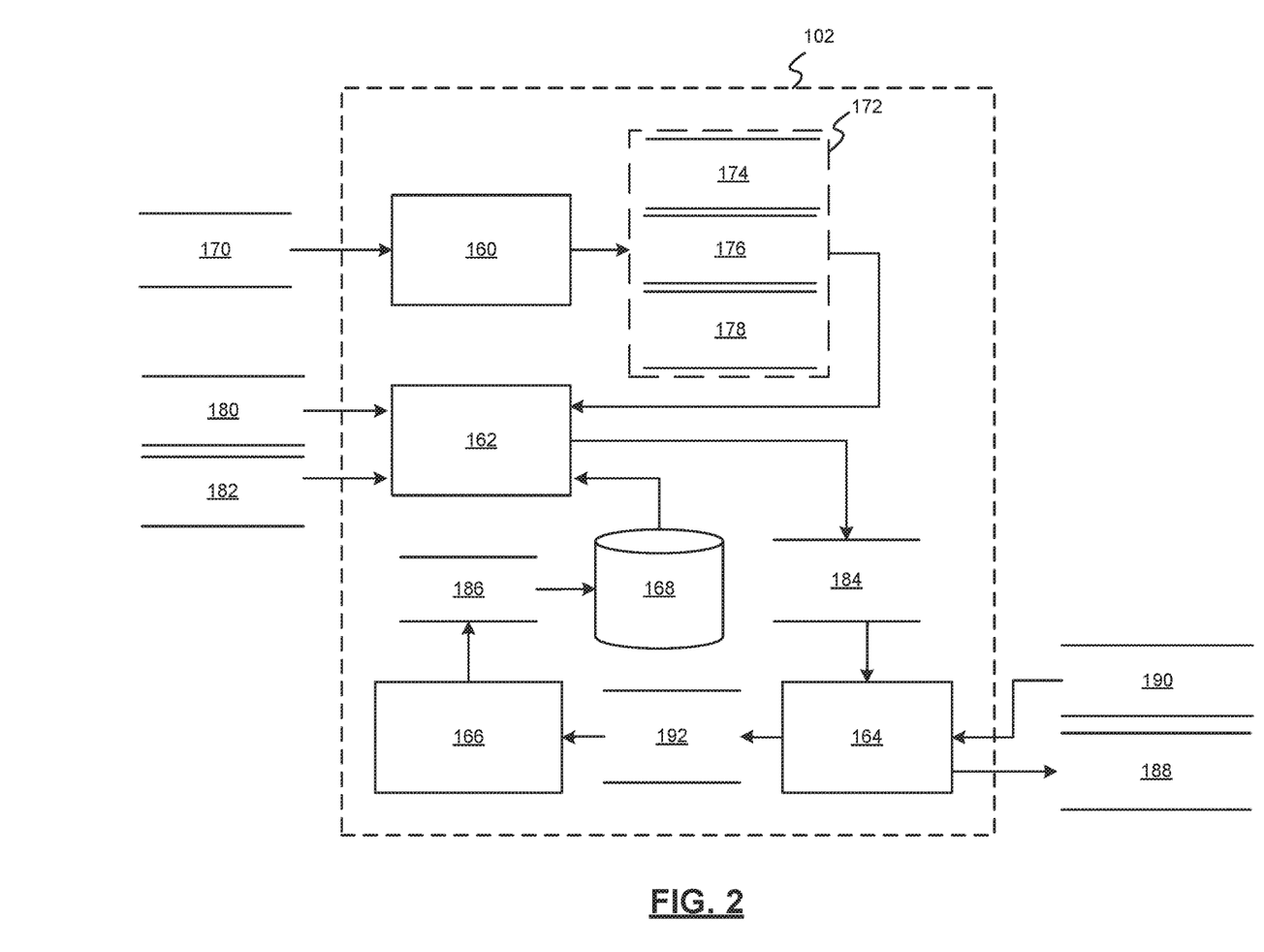
FIG. 2 is a dataflow diagram illustrating the control system for predicting the driver intention of lane change maneuvers, in accordance with various embodiments.

With reference to FIG. 2 and with continued reference to FIG. 1, a dataflow diagram illustrates the control system 102 comprising one or more modules for predicting driver intentions for performing a lane change maneuver. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality. As can be appreciated, in various embodiments, the modules shown in FIG. 2 may combined or further partitioned. In various embodiments, the control system 102 includes a traffic condition monitoring module 160, an intention prediction module 162, an intention confirmation module 164, a history data learning module 166, and a history data datastore 168.

In various embodiments, the traffic condition monitoring module 160 receives as input sensor data 170 from the perception system. The traffic condition monitoring module 160 evaluates the sensor data 170 to determine when certain traffic conditions for a lane change maneuver are met. The traffic condition monitoring module 170 sets one or more traffic condition flags 172 based on the evaluating.

In various embodiments, the sensor data 170 can indicate a vehicle speed, a current road configuration (the number of lanes, the type of lane, speed limit in the lane, etc.), and/or a flow of vehicles travelling in the lanes. The traffic conditions are defined to be met for a left lane change when the left adjacent lane maintaining safety margins to all relevant traffic participants and objects (e.g., vehicles, pedestrians, and road barriers, etc.) and the ego vehicle could be positioned within a safety corridor which defines upper and lower boundaries on its longitudinal position throughout the execution of a left lane change maneuver. The traffic conditions are defined to be met for a right lane change when the right adjacent lane maintaining safety margins to all relevant traffic participants and objects (e.g., vehicles, pedestrians, and road barriers, etc.) and the ego vehicle could be positioned within a safety corridor which defines upper and lower boundaries on its longitudinal position throughout the execution of a right lane change maneuver. The traffic conditions are defined to be met for an overtaking lane change maneuver when the vehicle speed of a vehicle in front of the vehicle 100 is less than the speed limit minus a speed offset and a total number of lanes in the road is two.

In various embodiments, the lane change traffic conditions include maintaining safety margins to all relevant traffic participants and objects e.g., vehicles, pedestrians, and road barriers in the surrounding traffic environment. This implies that ego vehicle must be positioned within a safety corridor which defines upper and lower boundaries on its longitudinal position throughout the execution of a maneuver such as a left lane change or right lane change.

When the evaluation of the sensor data 170 indicates that traffic conditions are met for a lane change to the left, the traffic condition monitoring module 160 sets a left lane change condition flag 174 to TRUE. Otherwise the left lane change condition flag 174 remains FALSE. When the evaluation of the sensor data 170 indicates that traffic conditions are met for a lane change to the right, the traffic condition monitoring module 160 sets a right lane change condition flag 176 to TRUE. Otherwise, the right lane change condition flag 176 remains FALSE. When the evaluation of the sensor data 170 indicates that traffic conditions are met for overtaking a vehicle, the traffic condition monitoring module 160 sets an overtaking condition flag 178 to TRUE. Otherwise, the overtaking condition flag 178 remains FALSE.

In various embodiments, the intention prediction module 162 receives as input the condition flags 172, driver gaze data 180, and driver facial recognition data 182. In various embodiments, the driver gaze data 180 indicates a gaze direction and/or location of the driver's eyes. In various embodiments, the driver facial recognition data 82 includes feature data indicating parameters identifying facial features of the driver which can be used as driver identification to load the driver's history of eye gaze activity pattern during a lane change maneuver for determining the driver intention of lane change maneuver.

The intention prediction module 162 evaluates the condition flags 172, the driver gaze data 180, and the driver facial recognition data 182 as driver identification to load the driver's history of eye gaze activity pattern during a lane change maneuver in order to predict the driver's intentions 184 to perform a lane change maneuver (e.g., right lane change, left lane change, overtaking, etc.). For example, the intention prediction module 162 evaluates the driver gaze data 180 during a lane change maneuver over time to determine driver gaze behavior. The driver gaze behavior can include, for example, driver eye activity including the number of times the driver's eyes switch from on-road to a side mirror or window (left or right) in a short time interval and the time the driver's eyes are focused on the side mirror or window (left or right). with different lane change maneuver traffic conditions.

The intention prediction module 162 then recognizes the driver based on the driver facial data and retrieves the same driver gaze behavior history data 186 for the recognized driver. The intention prediction module 162 then evaluates the condition flags 172 and compares the current driver gaze behavior data with the history data to determine the predicted intentions 184. For example, the intention prediction module 162 sets a left lane change flag to TRUE when the left lane change traffic condition flag 174 is TRUE and the current behavior data is less than or equal to the history data 186 for the left lane change (plus or minus an offset in some cases) with similar lane change traffic conditions such as ego vehicle speed, and adjacent lane traffics, etc. In another example, the intention prediction module 162 sets a right lane change flag to TRUE when the right lane change condition flag 176 is TRUE and the current behavior data is less than or equal to the history data 185 for the right lane change (plus or minus an offset in some cases) with similar lane change traffic conditions such as ego vehicle speed, and adjacent lane traffics, etc. In another example, the intention prediction module 162 sets an overtaking flag to TRUE when intention prediction flag for the right lane change or the left lane change is TRUE and the overtaking change condition flag 178 is TRUE.

Thereafter, the intention prediction module 162 sets the predicted intention 184 to one of Right Lane Change, Left Lane Change, and Overtaking based on the flags indicating a TRUE value. The predicted intention 184 is then associated with the traffic conditions and the recognized driver.

The confirmation module 164 receives the predicted intention data 184. The confirmation module 164 confirms the predicted intention with the driver. For example, the confirmation module 164 generates an intention confirmation request message 188 which is received by and presented to the user via a human machine interface module (HMI) (not shown). The HMI module, in turn, provides an intention confirmation response message 190 when the driver confirms or denies the intent to perform a lane change maneuver. The confirmation module 164 provides the confirmation information 192 including the denial or confirmation of the predicted lane change maneuver for the recognized driver. When the learning the driver's history of eye gaze data process is stabilized, the prediction of the driver intention could be at a very high accurate rate. The driver could trust the predication and have an option to request without confirmation.

Figure 6:
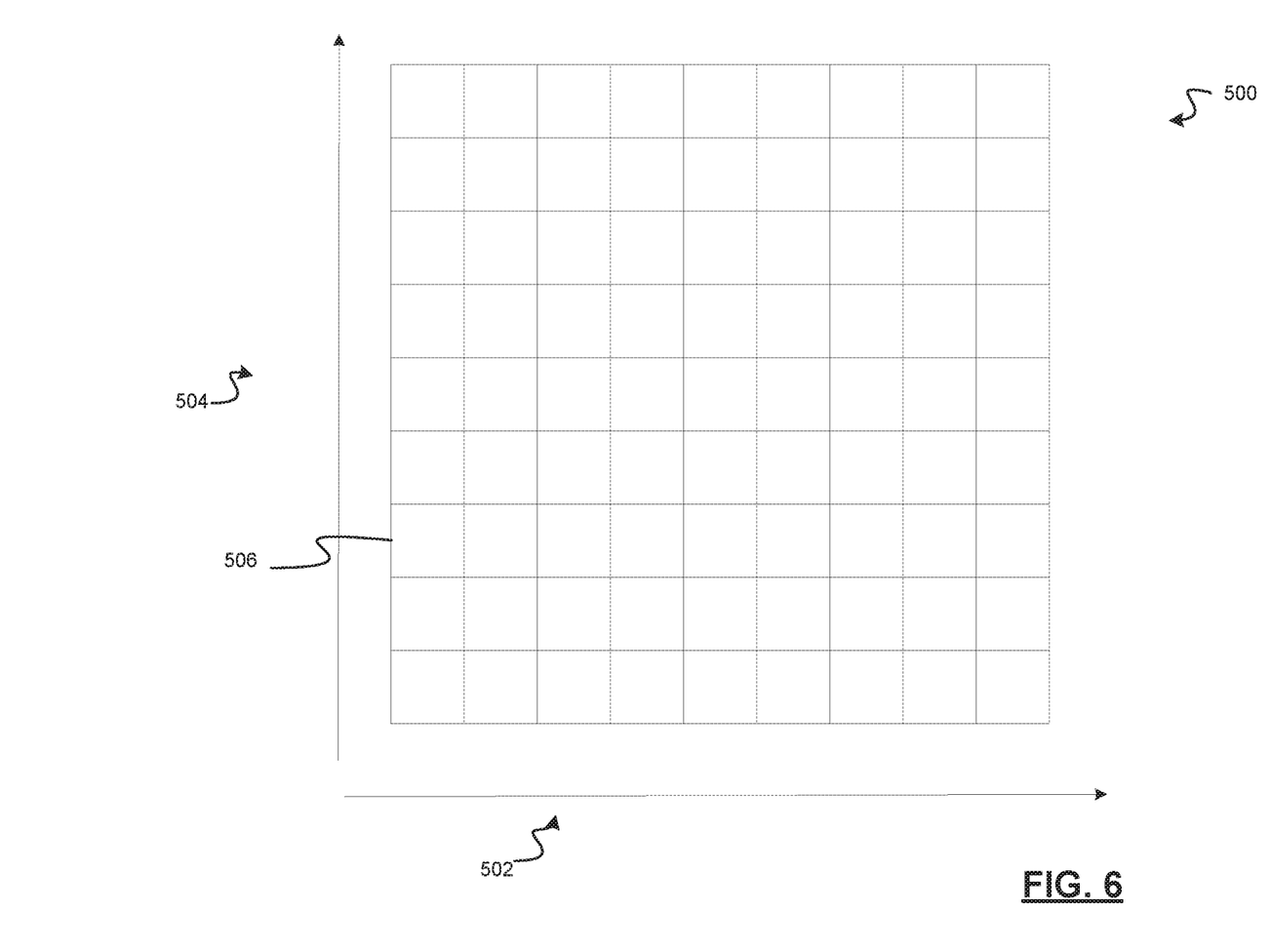
FIG. 6 is a graph illustrating a data structure for storing the driver's history of eye gaze data activity pattern during a lane change maneuver of the control system.

The history learning module 166 updates the history data datastore 168 with current driver eye gaze data at a corresponding datastore cell indexed by vehicle speed and the time waiting for traffic conditions met after receiving the confirmation information 192. For example, the history learning module 166 learns driver gaze behavior for a lane change maneuver for a driver and stores the information in a learning cell history data structure dedicated to that driver. FIG. 6 illustrates an exemplary history data structure 500. In various embodiments, the data structure 500 is defined by vehicle speed (MPH) on the x-axis 502 and the time of waiting for a lane change maneuver traffic conditions met on the y-axis 504. Each cell 506 of the data structure 500 stores a computed moving average of the driver gaze behavior data including a computed moving average of counts of eyes turning to the side mirrors, and a computed moving average of the accumulated time the eyes are on the side mirror during a lane change maneuver. The stored history data is then used by the intention prediction module 162 to determine the next prediction for the same driver.

Figure 3:
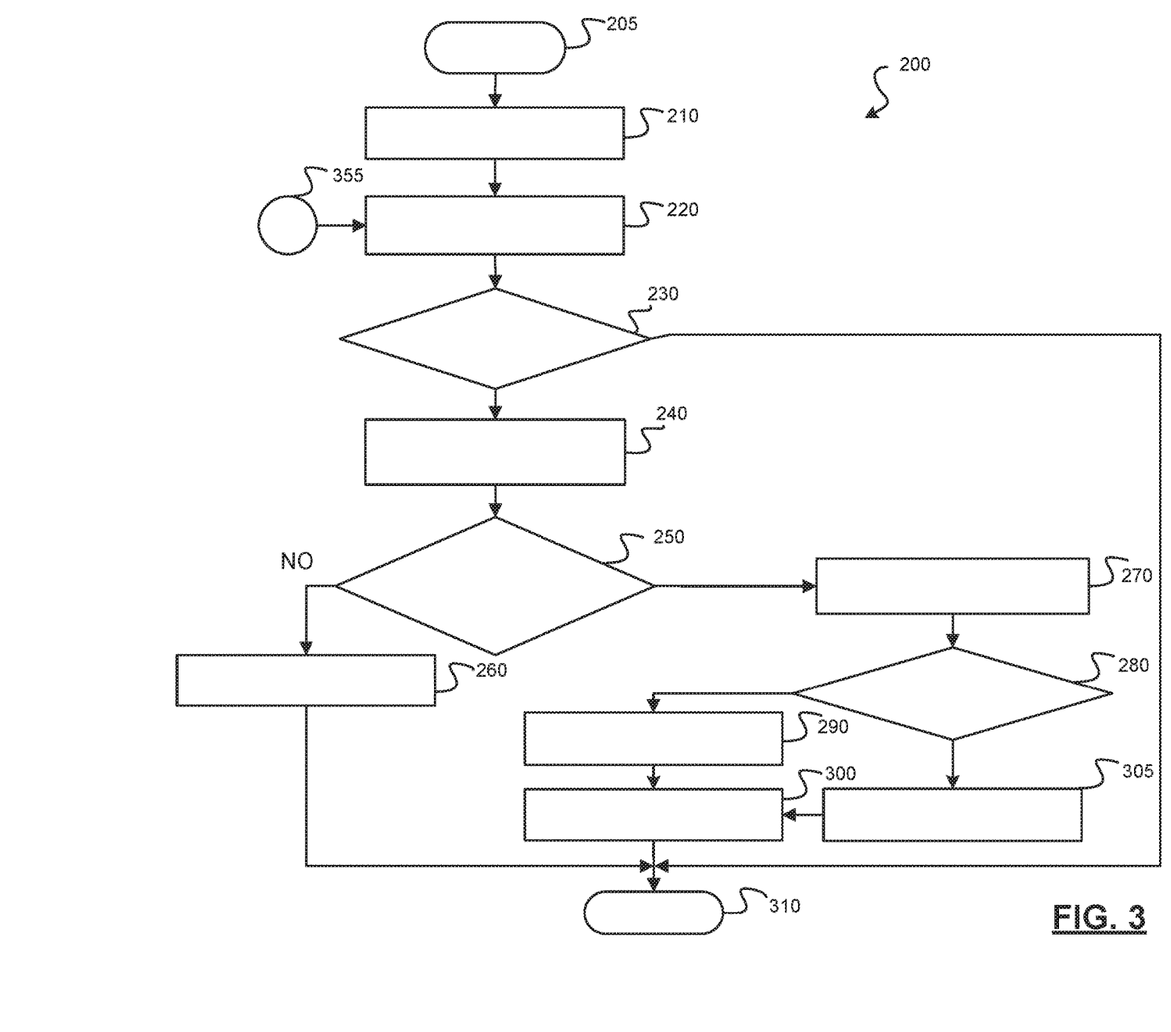
FIGS. 3, 4, and 5 are flowcharts illustrating methods for predicting driver intention of lane change maneuvers, in accordance with various embodiments.
Figure 4:
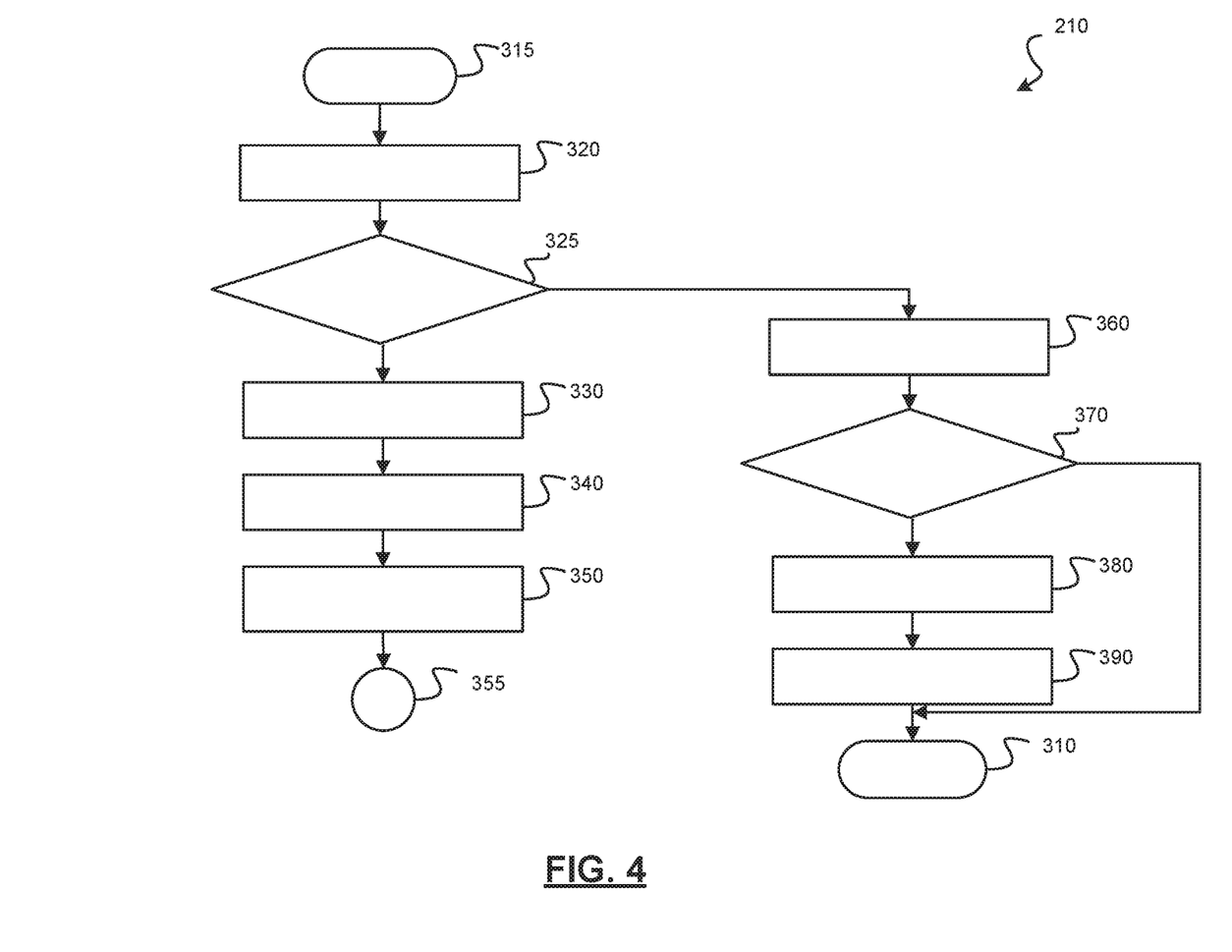
Figure 5:
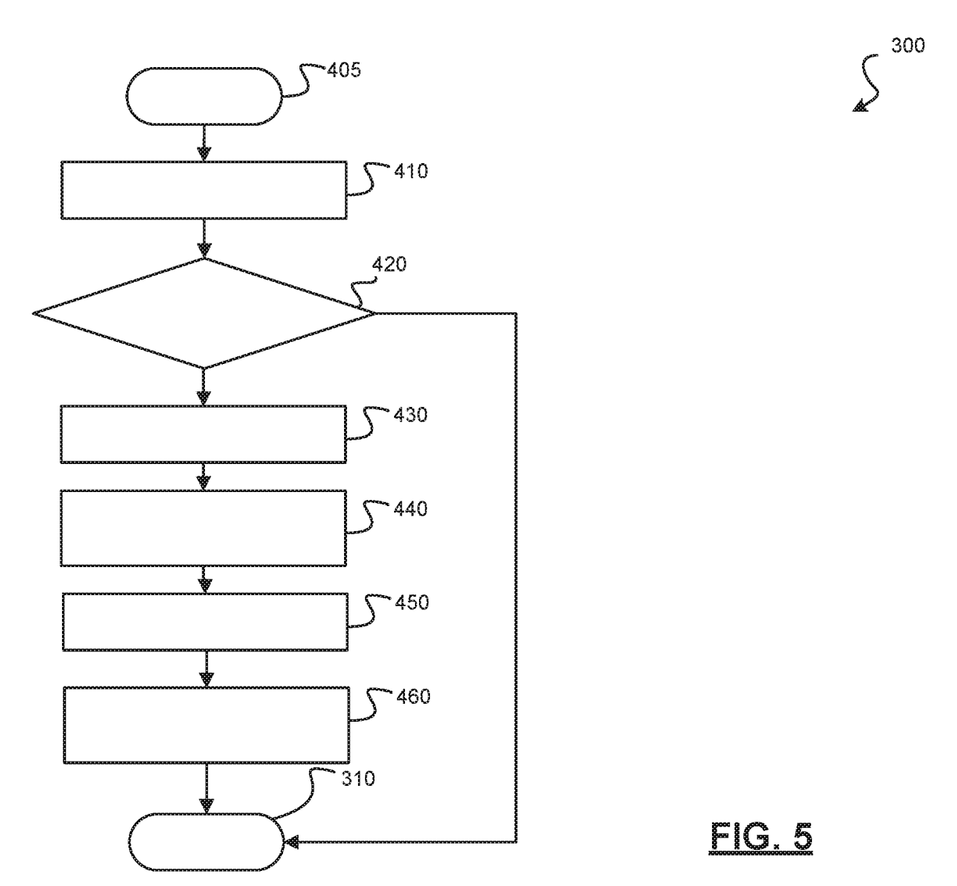

With reference now to FIGS. 3-5 and with continued reference to FIGS. 1 and 2, flowcharts illustrate exemplary methods for predicting driver intentions that may be performed by the systems of FIGS. 1 and 2. As can be appreciated, the order of the steps of the method may be altered, added, or removed in various embodiments.

FIG. 3 illustrates an exemplary method 200 of predicting driver intentions. In one example, the method 200 may begin at 205. A driver eye switch count and a driver focus time are determined at 210, for example as discussed in more detail with regard to FIG. 4. The traffic condition flags 172 are determined at 220. If a traffic condition flag for left or right lane change is TRUE at 230, the driver history data 186 is retrieved at 240, for example, based on the facial recognition of the driver and the condition that is TRUE. The current driver eye switch count and driver focus time are compared with the history data 186 (plus or minus an offset) with corresponding datastore cell which has the similar driving conditions such as vehicle speed, and lane change traffic conditions at 250. When the current driver eye switch count and the current driver focus time are less than or equal to the history data (plus or minus an offset) with corresponding datastore cell which has the similar driving conditions such as vehicle speed, and lane change traffic conditions at 260, the lane change intention flag is set to TRUE at 270. Thereafter, the traffic condition flag for overtaking is evaluated at 280. When the traffic condition flag for overtaking is TRUE at 280, the overtaking intentions is set to TRUE at 290 and a confirmation procedure is performed at 300, for example as discussed in more detail with regard to FIG. 5. Thereafter, the method may end at 310. When the traffic condition flag for overtaking is FALSE at 280, the overtaking intentions is set to FALSE at 305, the confirmation procedure is performed at 300, and the method may end at 310.

When the current driver eye switch count and the current driver focus time are greater than the history data with corresponding datastore cell which has the similar driving conditions such as vehicle speed, and lane change traffic conditions at 250, the lane change intention flag is set to FALSE at 160. Thereafter the method may end at 290.

FIG. 4 illustrates an exemplary method of determining the driver behavior data (step 210 of FIG. 3) including the driver switch count and the driver focus time. In FIG. 4, the method may begin at 315. The driver gaze data 180 is received and eye movement of the driver is evaluated to determine a direction or point of interest of driver's eye gaze at 320. When it is determined that the driver's eye gaze switches from on-road to a side mirror or window (left or right) at 325, timers and counter that track the driver's gaze behavior are updated. For example, an eyes on side mirror OFF timer is reset at 330. An eyes on mirror ON timer is increased at 340. An eyes on mirror counter is increased at the rising edge at 350. Thereafter, the method continues with 355, where the step 220 (FIG. 3) of the method 200 is performed.

When the driver's eye gaze is not determined to switch from on-road to a side mirror (remain at the same direction) at 320, the timers and counter that track the driver's behavior are updated. For example, the eyes on side mirror OFF timer is increased at 360. When the eyes on side mirror OFF timer is above a threshold at 370, the eyes on mirror ON timer is reset at 380. The eyes on mirror counter is reset at 390. Thereafter, the method may end at 290. When the eyes on side mirror OFF timer is less than or equal to the threshold at 370, the method may end at 310.

FIG. 5 illustrates an exemplary method for performing the confirmation procedure (step 300 of FIG. 3). In FIG. 5, the method may begin at 405. The intention confirmation response data 190 is received at 410. When the predicted driver intention is confirmed by the driver at 420, the driver behavior data is updated in the history data datastore 168 with the similar driving conditions such as vehicle speed, and lane change traffic conditions at 430-460. For example, the eyes on mirror ON timer is stored in the history data datastore 168 cell with the similar driving conditions such as vehicle speed, and lane change traffic conditions at 430. The moving average of the eyes on mirror ON timer is computed for the data structure 500 at 440. The eyes on mirror counter is stored in the history data datastore 168 with the similar driving conditions such as vehicle speed, and lane change traffic conditions at 450. The moving average of the eyes on mirror counter is computed for the data structure 500 at 460. Thereafter, the method may end at 310. When the predicted driver intention is not confirmed by the driver at 420, the method may end at 310.

Accordingly, the disclosed methods, systems, and vehicles provide for prediction of the intent of a driver to perform one or more lane change maneuvers. In various embodiments, the predictions are then used to develops driver lane change history data and control a vehicle based thereon.

It will be appreciated that the systems, vehicles, and methods may vary from those depicted in the Figures and described herein. For example, the vehicle 100, the control system 102, and/or various components thereof may vary from that depicted in FIG. 1 and described in connection therewith, in various embodiments. It will similarly be appreciated that the steps and/or implementations of the system and methods may differ from those depicted in FIGS. 2-6, and/or that various steps of the methods may occur concurrently and/or in a different order than that depicted in FIGS. 2-6, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a vehicle is provided, the method comprising:

monitoring an eye gaze of a driver of the vehicle by counting a number of driver eye switches from a first on-road direction to a second side mirror direction and accumulating a time of focus of the eye gaze on a side mirror;

monitoring current traffic conditions surrounding the vehicle, wherein the current traffic conditions include a vehicle speed of a front, in-path vehicle, a number of lanes, a safety margin of an adjacent lane, a safety corridor defined by upper and lower boundaries and associated with a lane of the vehicle;

predicting an intention of the driver to perform a lane change maneuver by evaluating each of the number of driver eye switches, the accumulated time of focus, a history of the eye gaze of the driver, and the current traffic conditions; and controlling, by the processor, the vehicle based on the predicted intention of the driver to perform a lane change maneuver.

2. The method of claim 1, further comprising: obtaining a camera image of the driver of the vehicle, via a camera of the vehicle, and wherein the monitoring the eye gaze is based on the camera image.

3. The method of claim 1, further comprising learning the history of the eye gaze of the driver and the predicted intention of the driver, and predicting future intentions of the driver based on the learned history of the eye gaze.

4. The method of claim 1, further comprising confirming the predicted intention of the driver with the driver through a human machine interface.

5. The method of claim 1, wherein the lane change maneuver includes at least one of a left lane change, and a right lane change.

6. The method of claim 5, wherein the traffic conditions include the adjacent lane maintaining safety margins to all relevant traffic participants and objects, and the vehicle being positioned within the safety corridor.

7. The method of claim 1, wherein the lane change maneuver includes an overtaking.

8. A system for controlling a vehicle is provided, the system comprising:

a driver monitoring system configured to capture driver eye gaze data;

a perception system configured to capture perception data associated with the environment of the vehicle; and a processor configured to:

monitor the driver gaze data to determine an eye gaze of a driver of the vehicle by counting a number of driver eye switches from a first on-road direction to a second side mirror direction and accumulating a time of focus of the eye gaze on a side mirror;

monitor the perception data to determine current traffic conditions surrounding the vehicle, wherein the current traffic conditions include a vehicle speed of a front, in-path vehicle, a number of lanes, a safety margin of an adjacent lane, a safety corridor defined by upper and lower boundaries and associated with a lane of the vehicle;

predict an intention of the driver to perform a lane change maneuver by evaluating each of the number of driver eye switches, the accumulated time of focus, a history of the eye gaze, and the current traffic conditions; and control the vehicle based on the predicted intention of the driver to perform a lane change maneuver.

9. The system of claim 8, wherein the driver monitoring system is further configured to obtain a camera image of the driver of the vehicle, via a camera of the vehicle, and wherein the processor monitors the eye gaze is based on the camera image.

10. The system of claim 8, wherein the processor is further configured to learn the history of the eye gaze and the predicted intention of the driver, and predict future intentions of the driver based on the history of the eye gaze.

11. The system of claim 8, wherein the processor is further configured to confirm the predicted intention of the driver with the driver through a human machine interface.

12. The system of claim 8, wherein the lane change maneuver includes at least one of a left lane change and a right lane change.

13. The system of claim 12, wherein the traffic conditions include the adjacent lane maintaining safety margins to all relevant traffic participants and objects, and the vehicle being positioned within the safety corridor.

14. The system of claim 8, wherein the lane change maneuver includes an overtaking.

* * * * *